United States Patent
Liu et al.

(10) Patent No.: US 11,265,846 B2
(45) Date of Patent: Mar. 1, 2022

(54) SYSTEM AND METHOD FOR USING COMMUNICATION RESOURCES

(71) Applicant: ZTE CORPORATION, Guangdong (CN)

(72) Inventors: Xu Liu, Guangdong (CN); Bo Dai, Guangdong (CN); Xiubin Sha, Guangdong (CN); Ting Lu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 148 days.

(21) Appl. No.: 16/784,043

(22) Filed: Feb. 6, 2020

(65) Prior Publication Data

US 2020/0178211 A1 Jun. 4, 2020

Related U.S. Application Data

(63) Continuation of application No. PCT/CN2017/097251, filed on Aug. 11, 2017.

(51) Int. Cl.
| | | |
|---|---|---|
| *H04W 72/00* | (2009.01) | |
| *H04W 24/02* | (2009.01) | |
| *H04W 74/08* | (2009.01) | |
| *H04W 76/11* | (2018.01) | |
| *H04W 76/27* | (2018.01) | |

(52) U.S. Cl.
CPC ......... *H04W 72/005* (2013.01); *H04W 24/02* (2013.01); *H04W 74/0833* (2013.01); *H04W 76/11* (2018.02); *H04W 76/27* (2018.02)

(58) Field of Classification Search
CPC . H04W 74/0833; H04W 24/02; H04W 76/11; H04W 48/20; H04W 72/005; H04W 48/12; H04W 76/27; H04W 36/00835
See application file for complete search history.

(56) References Cited

U.S. PATENT DOCUMENTS

| | | | |
|---|---|---|---|
| 8,824,307 B2 * | 9/2014 | Zhang | H04W 36/0069 370/241 |
| 2011/0312316 A1 | 12/2011 | Baldemair et al. | |
| 2012/0195283 A1 * | 8/2012 | Kwon | H04W 72/042 370/329 |
| 2015/0289144 A1 | 10/2015 | Yi et al. | |
| 2017/0223723 A1 * | 8/2017 | Das | H04W 72/048 |

(Continued)

FOREIGN PATENT DOCUMENTS

CN 104770009 A 7/2015

OTHER PUBLICATIONS

Mediatek Inc., "RACH and Paging on non-anchor NB-IoT Carrier," 3GPP TSG RAN WG2 Meeting #95, R2-164953, Goteborg, Sweden, Aug. 22-26, 2016, 3 pages.

(Continued)

*Primary Examiner* — Brian D Nguyen
(74) *Attorney, Agent, or Firm* — Duane Morris LLP

(57) ABSTRACT

A system and method for transmitting a signal are disclosed herein. In one embodiment, the system and method are configured to perform: broadcasting at least one signal via a broadcast channel within a first cell using an anchor carrier, wherein the broadcast channel is associated with the anchor carrier, and wherein the at least one signal indicates information about a plurality of non-anchor carriers that are respectively used in a plurality of second cells.

18 Claims, 3 Drawing Sheets

(56) References Cited

U.S. PATENT DOCUMENTS

| | | | |
|---|---|---|---|
| 2019/0149185 A1* | 5/2019 | Liu | H04B 1/406 |
| | | | 375/130 |
| 2019/0150079 A1* | 5/2019 | Chen | H04J 11/0076 |
| | | | 370/330 |
| 2019/0174378 A1* | 6/2019 | Chang | H04W 76/27 |
| 2021/0227433 A1* | 7/2021 | Wei | H04W 36/00837 |

OTHER PUBLICATIONS

ZTE, "Consideration for PRACH on multi-carrier in NB-IoT," 3GPP TSG RAN WG2 Meeting #95, R2-164859, Gothenburg, Sweden, Aug. 22-26, 2016, 6 pages.

* cited by examiner

SYSTEM AND METHOD FOR USING COMMUNICATION RESOURCES

The present application is a bypass continuation application based on PCT Application No. PCT/CN2017/097251, filed on Aug. 11, 2017 and entitled, "System and Method for Using Communication Resources," the contents of which is incorporated by reference herein in its entirety.

TECHNICAL FIELD

This disclosure relates generally to wireless communications and, more particularly, to systems and methods for using communication resources.

BACKGROUND

In accordance with rapid developments and increasing needs of the Internet of Things (IoT), a new radio protocol, a Narrowband Internet of Things (NB-IoT), has been proposed by the $3^{rd}$ Generation Partnership Project (3GPP). The NB-IoT is aimed to enhance existing Global System for Mobile Communications (GSM) and Long-Term Evolution (LTE) networks to better support IoT uses or applications. Improved indoor coverage, support for massive number of low throughput end devices, low delay sensitivity, ultra-low device cost, coverage extension, battery lifetime extension, and backward compatibility are some exemplary objectives of the NB-IoT.

Generally, in a wireless communication system adopting the NB-IoT (hereinafter "NB-IoT system"), when a user equipment device (UE) is first switched on, the UE selects a network (e.g., a public land mobile (PLMN) network) that the UE will register with, and then a cell, belonging to the selected network, that the UE will camp on. The cell is typically defined by a base station (BS) to have a corresponding radio coverage. When the UE moves, in order to maintain receiving stable signals, the UE may need to reselect a cell, which is typically referred to as a "handover" procedure. In existing NB-IoT systems, options of cells from which the UE can select are limited to cells with a relatively large radio coverage, for example, a macro cell.

Such a limit on the options of cells to be reselected may encounter various issues. For example, when the UE has a relatively low transmission power, which is typical in the NB-IoT, and camps on a cell with a relatively large radio coverage, the UE may not have enough transmission power to send a signal. As such, uplink communication (i.e., the communication from the UE to a BS that defines the reselected cell) may be disadvantageously affected. Thus, in a network used by existing NB-IoT systems, respective communication resources are not efficiently used in terms of defining cells.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method includes: broadcasting at least one signal via a broadcast channel within a first cell using an anchor carrier, wherein the broadcast channel is associated with the anchor carrier, and wherein the at least one signal indicates information about a plurality of non-anchor carriers that are respectively used in a plurality of second cells.

In a further embodiment, a method includes: receiving at least one signal broadcasted via a broadcast channel within a first cell, wherein the at least one signal is modulated using an anchor carrier and wherein the broadcast channel is associated with the anchor carrier; wherein the at least one signal indicates information about a plurality of non-anchor carriers that are respectively used in a plurality of second cells.

In another embodiment, a communication node includes: a transmitter configured to broadcast at least one signal via a broadcast channel within a first cell using an anchor carrier, wherein the broadcast channel is associated with the anchor carrier, and wherein the at least one signal indicates information about a plurality of non-anchor carriers that are respectively used in a plurality of second cells.

In yet another embodiment, a communication node includes: a receiver configured to receive at least one signal broadcasted via a broadcast channel within a first cell, wherein the at least one signal is modulated using an anchor carrier and wherein the broadcast channel is associated with the anchor carrier; wherein the at least one signal indicates information about a plurality of non-anchor carriers that are respectively used in a plurality of second cells.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Figure 1:
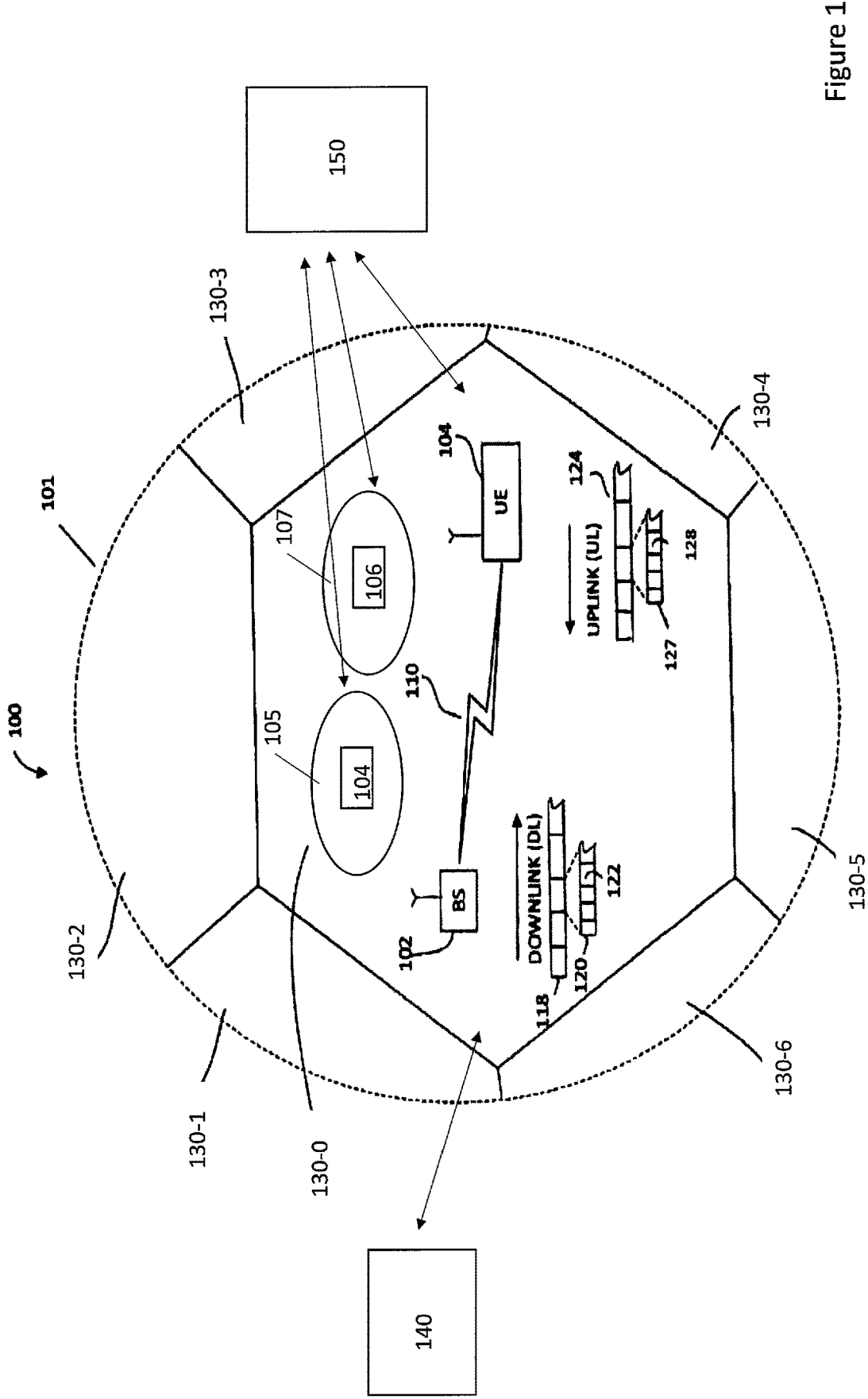
FIG. 1 illustrates an exemplary cellular communication network in which techniques disclosed herein may be implemented, in accordance with an embodiment of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The present disclosure provides various embodiments of systems and methods of an NB-IoT system using communication resources of a network more efficiently through defining a plurality of cells with a smaller radio coverage (e.g., a micro cell, a pico cell, a femto cell, etc.) within a cell with a greater radio coverage (e.g., a macro cell). In some embodiments, the communication resources can be implemented by a plurality of carriers, each of which is located at a respective frequency location and spans over a global bandwidth (e.g., 180 kHz). One of the plurality of carriers is used as an anchor carrier, and the remaining carriers are used as non-anchor carriers. In some embodiments, the anchor carrier is used in the macro cell, and the non-anchor carriers are each used in a respective micro cell contained in the macro cell. Alternatively stated, each of the plurality of micro cells may be defined by a respective non-anchor carrier, according to some embodiments.

In some embodiments, the anchor carrier is used to transmit signals carrying synchronization information and/or system information such as, for example, a narrowband primary synchronization signal (NPSS), a narrowband secondary synchronization signal (NSSS), a narrowband physical broadcast channel (NPBCH) signal, system information block (SIB), etc.; and the non-anchor carrier is used to transmit signals carrying control information and/or data such as, for example, a narrowband physical downlink control channel (NPDCCH) signal, a narrowband physical downlink shared channel (NPDSCH) signal, a narrowband physical shared channel (NPUSCH) signal, etc.

More specifically, in some embodiments, the anchor carrier may be used in the macro cell to broadcast a signal (e.g., a system information signal) indicating information about at least a subset of the plurality of non-anchor carriers that are each to be used in a respective micro cell such as, for example, how each micro cell is defined by the respective non-anchor carrier, which will be discussed in further detail below. As such, when plural UE's in the NB-IoT system, each of which has a respective different communication capability, move around and would like to perform handover procedures, according to some embodiments, each of the UE's can select either the macro cell or one of the plurality of micro cells to camp on based on the information indicated in the broadcasted system information signal, which will be discussed in further detail below. Thus, the communication resources in the network can be more efficiently used by an NB-IoT system.

FIG. 1 illustrates an exemplary wireless communication network 100 in which techniques disclosed herein may be implemented, in accordance with an embodiment of the present disclosure. In the following discussion, the wireless communication network 100 may be used by an NB-IoT system, which is herein referred to as "network 100." Such an exemplary network 100 includes a cluster of notional cells 130-0, 130-1, 130-2, 130-3, 130-4, 130-5 and 130-6 overlaying a geographical area 101. In FIG. 1, a base station 102 (hereinafter "BS 102") and a user equipment device 104 (hereinafter "UE 104") are contained within a respective geographic boundary of the cell 130-0. Each of the other cells 130-1, 130-2, 130-3, 130-4, 130-5 and 130-6 may include at least one base station operating at its allocated carrier and bandwidth to provide adequate radio coverage to its intended users.

In accordance with some embodiments of the present disclosure, the cells 130-0, 130-1, 130-2, 130-3, 130-4, 130-5 and 130-6 may be each a macro cell that has a relatively larger radio coverage (e.g., about 1-30 kilometers). And, as mentioned above, each of such macro cells includes a plurality of micro cells that each has a relatively smaller radio coverage (e.g., about 200-2000 meters). In the illustrated embodiment of FIG. 1, the macro cell 130-0 includes two micro cells 105 and 107 that respectively include base stations 104 and 106. Although only two micro cells are shown in the macro cell 103-0 and such two micro cells 105 and 107 are not overlapped, it is understood that the macro cell 103-0 may include (e.g. define) any desired number of micro cells and at least some of them may be overlapped with each other while remaining within the scope of the present disclosure.

In some embodiments, when the UE 104 is in the macro cell 103-0, the BS 102 and the UE 104 can communicate with each other via a communication link 110 (e.g., a wireless communication carrier). For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. Further, in some embodiments, when the UE 104 moves around, the UE 104 may use various information transmitted on the communication link 110 to perform a handover procedure, which will be discussed below, so as to select either staying in the macro cell 103-0, or camping on one of the other macro cells 1031 to 103-6, or camping on one of the micro cells (e.g., 105 and 107) within the macro cell 103-0. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention.

Figure 2:
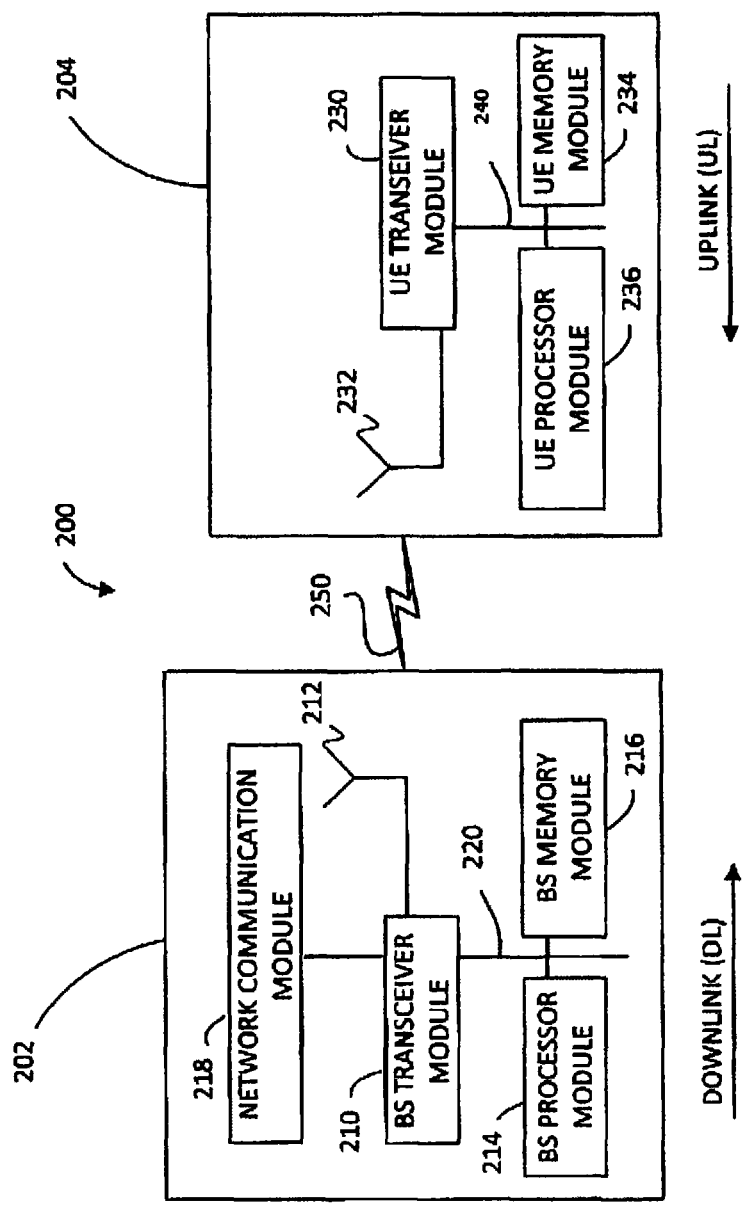
FIG. 2 illustrates block diagrams of an exemplary base station and a user equipment device, in accordance with some embodiments of the present disclosure.

FIG. 2 illustrates a block diagram of an exemplary wireless communication system 200 for transmitting and receiving wireless communication signals, e.g., OFDM/OFDMA signals, in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the network 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a date communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver 230 may be referred to herein as an "uplink" transceiver 230 that includes an RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 210 and the base station transceiver 210 are configured to support industry standards such as the Long Term Evolution (LTE) and emerging 5G standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Referring again to FIG. 1, according to some embodiments, the BS 102 uses the wireless communication link 110, which includes an anchor carrier, to broadcast a signal within the area of the cell 103-0. As such, every UE in the cell 103-0, including the UE 104 shown in FIG. 1, may receive the broadcasted signal. In some embodiments, the broadcasted signal includes: a list of the neighboring cells 103-1 to 103-6, and information about a plurality of non-anchor carriers that are respectively used in the plurality of micro cells, e.g., 105 and 107 in FIG. 1. Further, in some embodiments, the information about the plurality of non-anchor carriers includes at least one of: a list of the plurality of non-anchor carriers, a respective frequency location of each of the plurality of non-anchor carriers, a respective closed subscriber group (CSG) identifier associated with each of the plurality of micro cells, a respective transmission power level of a narrowband reference signal (NRS) associated with each of the plurality of micro cells, and a respective threshold of a coverage enhancement level (CEL) associated with each of the plurality of micro cells.

Figure 3:
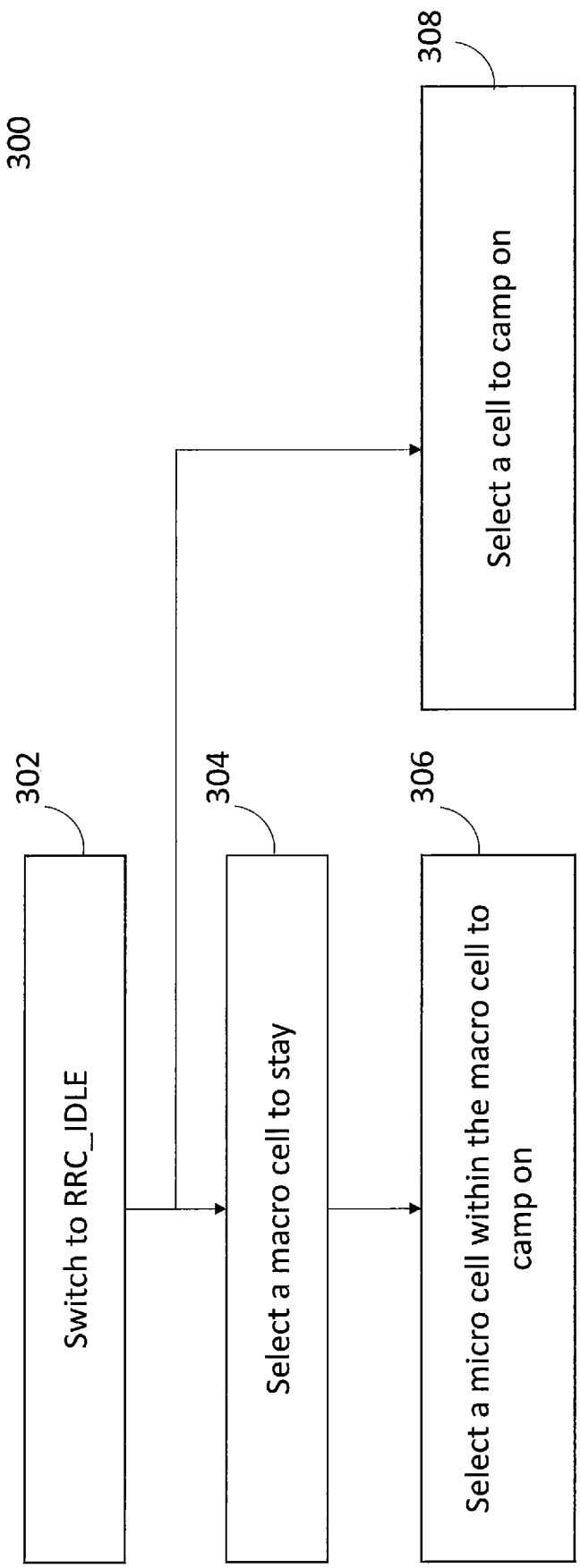
FIG. 3 illustrates a flow chart of an exemplary method to reselect a cell in the cellular communication network of FIG. 1 to camp on, in accordance with some embodiments of the present disclosure.

In accordance with some embodiments, when the UE 104 receives the broadcasted signal containing the above-described information, the UE 104 may perform a handover procedure to select a cell to camp on, which will be described in a flow chart of an exemplary method 300 of FIG. 3. Since, in some embodiments, operations of the method 300 are each performed by the component in FIG. 1, the references numerals in FIG. 1 continue to be used in the following discussion of FIG. 3. In some embodiments, the method 300 starts with operation 302 in which the UE 104 first switches from an RRC (radio resource control)_Connected state to an RRC_Idle state. The method 300 continues to operation 304 in which the UE 104 selects a macro cell to stay. In some embodiments, the UE 104 uses the broadcasted signal, which includes the list of the neighboring cells 103-1 to 103-6, to determine which of the macro cells 103-0 to 103-6 has a best signal condition, and selects a macro cell having the best signal condition. More specifically, in some embodiments, the list of the neighboring cells 103-1 to 103-6 may be further indicative of frequency information of a respective reference signal broadcasted in each of the neighboring cells 103-1 to 103-6. As such, the UE 104 may measure a reference signal received power (RSRP) value of each of the reference signals broadcasted in the neighboring cells 103-0 to 103-6, and use a typically known "R" rule to select a macro cell. In the current example, the macro cell 103-0 is selected.

Next, the method 300 continues to operation 306 in which the UE 104 selects one of a plurality of micro cells contained in the selected macro cells (operation 304) to camp on. In some embodiments, the UE 104 may switch back to the RRC_Connected state at operation 306 in response to a paging signal that is broadcasted within the macro cell 103-0. More specifically, based on the broadcasted signal including the information about the plurality of non-anchor carriers, various techniques can be performed by the UE 104 to select one of the micro cells to camp on. In a first example, the UE 104 compares each of the CSG identifiers contained in the broadcasted signal with a CSG identity list previously stored by the UE 104. If there is a match (i.e., one of the CSG identifiers matches one identity on the previously stored CSG identity list), the UE 104 may select a micro cell with the matched CSG identifier to camp on.

In a second example, the UE 104 measures a reference signal received power (RSRP) level of each of the narrowband reference signals (NRS's) that are respectively transmitted within the plural micro cells of the macro cell 103-0. Accordingly, the UE 104 selects a micro cell with the best (e.g., the highest) RSRP level to camp on. In some embodiments, the base station (e.g., 104, 106, etc.) in each of the micro cells (e.g., 105, 107, etc.) in the macro cell 103-0 may use a respective assigned non-anchor carrier to transmit the respective NRS.

In a third example, in addition to the RSRP levels measured in the second example, the UE 104 may further use the measured RSRP levels to calculate respective path loss values. In some embodiments, the path loss value for each micro cell may be calculated based on a difference of the measured RSRP level (of each micro cell) and the transmission power level of the NRS (of each micro cell) that is contained in the broadcasted signal. Accordingly, the UE 104 can compare the path loss values of the plural micro cells in the macro cell 103-0 and selects a micro cell with the best (e.g., the lowest) path loss value to camp on.

In some other embodiments, after the operation 302, the method 300 may proceed to operation 308 in which the UE 104 directly selects a cell to camp on, wherein the cell may include one of: a serving macro cell (e.g., the macro cell where the UE 104 receives the broadcasted signal), and a plurality of micro cells in the serving macro cell. In some embodiments, the UE 104 may switch back to the RRC_Connected state at operation 308 in response to a paging signal that is broadcasted within the serving macro cell 103-0, or within each of the plurality of micro cells in the serving macro cell 103-0, or within the macro cell 103-0 and each of the plurality of micro cells in the serving macro cell 103-0. More specifically, based on the broadcasted signal including the information about the plurality of non-anchor carriers, various techniques can be performed by the UE 104 to select one of the cells to camp on. In a first example, the UE 104 compares the aforementioned pass loss value of each of the cells (including the macro cell 103-0 and the micro cells 105 and 107 within the macro cell 103-0), and selects a cell with the best (e.g., the lowest) path loss value to camp on.

In a second example, the UE 104 measures the aforementioned RSRP level of each of the cells (including the macro cell 103-0 and the micro cells 105 and 107 within the macro cell 103-0), filters out the cell associated with an RSRP level that is smaller than a pre-defined RSRP threshold, which corresponds to the threshold of the CEL, calculates respective path loss values of the remaining RSRP levels (i.e., not being filtered out), and selects a cell with the best (e.g., the lowest) path loss value to camp on.

In a third example, the UE 104 compares an updated RSRP level of each of the micro cells within the macro cell 103-0 with the measured RSRP level of the macro cell 103-0, and selects a cell with the best (e.g., the highest) updated RSRP level or measured RSRP level to camp on. In some embodiments, the updated RSRP level of each micro cell may be calculated as a sum of the respective measured RSRP level and a difference between the respective transmission power levels of the macro cell's NRS and the micro cell's NRS. For example, when the respective transmission power levels of the macro cell 103-0's NRS and the micro cell 105's NRS are 30 dB (decibel) and 10 dB and the RSRP levels of the macro cell 103-0 and 105 are 15 dB and 5 dB, the difference is 20 dB (30 minus 10). As such, the updated RSRP level of the micro cell 105 is 25 dB (5 plus 20).

Referring again to FIG. 1, the BS 102 may use the broadcasted signal, transmitted on the anchor carrier, to allocate respective physical random access channel (PRACH) resources to each of the plurality of micro cells (e.g., 105, 107, etc.) of the macro cell 103-0 based on various considerations. In a first example, the BS 102 may not consider the respective CEL's of the plurality of micro cells, and allocate each micro cell respective PRACH resources, which may be included in the broadcasted signal. In a second example, the BS 102 may consider the respective CEL's of the plurality of micro cells, and allocate each micro cell respective PRACH resources based on the respective CEL's. More specifically, in some embodiments, the BS 102 allocates a CEL-specific PRACH resource for each of the micro cells contained in the macro cell 103-0. The BS 102 of the macro cell 103-0 then broadcasts such information about the allocation of the PRACH resources. The UE 104, which may be in the macro cell 103-0 or one of the plural micro cells, retrieves the respective CEL based on a measurement of RSRP, and then gets the corresponding PRACH resource. In a third example, the BS 102 may consider the respective CEL's of the plurality of micro cells contained in the macro cell 103-0 and a CEL of the macro cell 103-0, and allocate each micro cell respective PRACH resources based on the respective CEL's of the plurality of micro cells and the CEL of the macro cell 103-0. More specifically, in some embodiments, the BS 102 of the macro cell 103-0 allocates respective CEL-specific PRACH resources for the macro cell 103-0 and the micro cells 103-1 to 103-6 based on the CEL of each of the macro cell 103-0 and the micro cells 103-01 to 103-6. That is, the CEL of the micro cell 103-0 and the CEL's of the macro cells 103-1 to 103-6 constitute a two-dimensional map of the PRACH resources.

In some embodiments, only the macro cell 103-0 is connected to a core network 140 (e.g., an evolved packet core (EPC) network). As such, an S1-interface may be present between a mobility management entity (MME) of the EPC network 140 and the macro cell 103-0. In some embodiments, the plurality of micro cells of the macro cell 103-0 may each have an incomplete communication protocol, e.g., a protocol without a radio link control (RLC) layer. In some embodiments, the BS 102 may send various S1-interface messages to the MME in order to allow the UE 104, regardless of which cell the UE 104 is located in, to communicate with the EPC network.

For example, the BS 102 may send: a first S1-interface message that includes a respective physical cell identifier associated with each of the plurality of micro cells of the macro cell 103-0, a respective CSG identifier associated with each of the plurality of micro cells of the macro cell 103-0, and a respective access mode associated with each of the plurality of micro cells of the macro cell 103-0; a second S1-interface message that includes a shared physical cell identifier associated with the macro cell 103-0 and the plurality of micro cells of the macro cell 103-0, a shared CSG identifier associated with the macro cell 103-0 and the plurality of micro cells of the macro cell 103-0, a shared access mode associated with the macro cell 103-0 and the plurality of micro cells of the macro cell 103-0; and/or a third S1-interface message that includes respective different physical cell identifiers associated with the macro cell 103-0 and the plurality of micro cells of the macro cell 103-0, respective different CSG identifiers associated with the macro cell 103-0 and the plurality of micro cells of the macro cell 103-0, respective different access modes associated with the macro cell 103-0 and the plurality of micro cells of the macro cell 103-0.

Accordingly, when the UE 104 is in the macro cell 103-0, in some embodiments, the UE 104 may directly receive data signals (DL signals) from the EPC network 140, and similarly, the UE 104 may directly transmit data signals (UL signals) to the EPC network 140. And when the UE 104 is in one of the micro cells of the macro cell 103-0, in some embodiments, the UE 104 may receive data signals (DL signals) from the EPC network 140 through the BS 102 of the macro cell 103-0, and similarly, the UE 104 may transmit data signals (UL signals) to the EPC network 140 through the BS 102 of the macro cell 103-0.

Further, when each of the micro cells of the macro cell 103-0 has an incomplete communication protocol, during a random access procedure, typically known as an RACH procedure, after the UE 104 sends a msg 3, including an RRC Connection Request, to the BS 102 of the macro cell 103-0 and before the BS 102 sends a msg 4, including an RRC Connection Setup, back to the UE 104, a currently serving micro cell (i.e., the micro cell where the UE 104 is currently in) may interact with other micro cells to determine at least one more "suitable" micro cell to instruct such a more suitable micro cell to allocate RACH resources, which allows the UE 104 to send a msg 5, including an RRC Connection Setup Complete. The current cell performs information interaction with other micro cells. The interacted information includes a load of the current cell, access control parameters of the current cell, etc. The current cell makes a comprehensive assessment based on the interacted information to find a more suitable cell. For example, a cell with low load and/or weak access control may be considered as the more suitable cell. Further, if the UE 104 has a high access priority, then UE 104 may only need to make a major consideration according to the load factor. In some embodiments, the BS 102 of the macro cell 103-0 may, through the msg 4, instruct the UE 104 to move to the more suitable micro cell for sending the msg 5 and subsequent signals. As known in the art, the above-mentioned msg 3, msg 4, and msg 5 are used for making an RRC connection request to initiate an RRC connection, providing contention resolution during the RRC connection setup, responding the RRC connection setup being completed, respectively, so that corresponding detailed descriptions are not repeated here.

In some other embodiments, the macro cell 103-0 and the plurality of the micro cells therein are each connected to a core network 150 (e.g., an evolved packer core (EPC) network). As such, a respective S1-interface may be present between a mobility management entity (MME) of the EPC network 150 and each of the macro cell 103-0 and the micro cells within the macro cell 103-0. In some embodiments, the plurality of micro cells of the macro cell 103-0 may each have a complete communication protocol. In such embodiments, regardless of whether the UE 104 is in the macro cell 103-0 or one of the micro cells, the UE 104 may directly receive data signals (DL signals) from the EPC network 150, and similarly, the UE 104 may directly transmit data signals (UL signals) to the EPC network 150.

Further, when each of the micro cells of the macro cell 103-0 has a complete communication protocol, during a random access procedure, typically known as an RACH procedure, after the UE 104 sends a msg 3, including an RRC Connection Request, to a respective base station of a currently serving micro cell and before the base station sends a msg 4, including an RRC Connection Setup, back to the UE 104, the serving micro cell may interact with other micro cells to determine at least one more "suitable" micro cell to instruct such a more suitable micro cell to allocate RACH resources, which allows the UE 104 to send a msg 5, including an RRC Connection Setup Complete. In some embodiments, the base station of the serving micro cell may, through the msg 4, instruct the UE 104 to move to the more suitable micro cell for sending the msg 5 and subsequent signals.

In some alternative embodiments, the above-mentioned micro cell may not have its own cell identifier. However, the micro cell is still assigned with a respective non-anchor carrier. As such, the macro cell that contains such micro cells doesn't need to broadcast information about the non-anchor carriers that are respectively used by the micro cells. That is, there is no need to broadcast the mapping relation between non-anchor carrier and the micro cell in the system information. The UE can initiate an RACH, or PRACH, procedure in the macro cell. In the RACH procedure, the macro cell sends a reconfiguration message to the UE, which may be carried by a msg 2 (random access response) or the msg 4 (RRCConnectionSetup) or contained in a specific signaling (RRCConnectionReconfiguration). The reconfiguration message includes the information about which non-anchor carrier the UE should use for uplink (UL) transmission. When the UE gets the reconfiguration information, the UE will use the corresponding non-anchor carrier for UL transmission. The downlink (DL) transmission can still be transmitted via the macro cell.

In such alternative embodiments, the BS of the macro cell broadcasts the system information that includes match information between PRACH resource (e.g., which carriers can be used for PRACH) and UL resource (e.g., which carrier can be used for UL transmission). Accordingly, if the UE randomly chooses one carrier for PRACH in the macro cell, the UE may retrieve a corresponding non-anchor carrier for UL transmission. The UE will use the UL resource (non-anchor carrier) for UL transmission.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
   broadcasting at least one signal via a broadcast channel within a first cell using an anchor carrier, wherein the broadcast channel is associated with the anchor carrier, and
   wherein the at least one signal indicates information about a plurality of non-anchor carriers that are respectively used in a plurality of second cells, wherein when one of the plurality of second cells is to connect to a core network, the method further comprises at least one of:
   sending a first S1-interface message that includes a respective physical cell identifier associated with each of the plurality of second cells, a respective closed subscriber group identifier associated with each of the plurality of second cells, and a respective access mode associated with each of the plurality of second cells;
   sending a second S1-interface message that includes a shared physical cell identifier associated with the first cell and the plurality of second cells, a shared closed subscriber group identifier associated with the first cell and the plurality of second cells, a shared access mode associated with the first cell and the plurality of second cells; and
   sending a third S1-interface message that includes respective different physical cell identifiers associated with the first cell and the plurality of second cells, respective different closed subscriber group identifiers associated with the first cell and the plurality of second cells, respective different access modes associated with the first cell and the plurality of second cells.

2. The method of claim 1, wherein the first cell comprises a macro cell, and each of the plurality of second cells comprises a micro cell.

3. The method of claim 1, wherein the at least one signal further indicates a list of a plurality of neighboring cells that each has a similar radio coverage as the first cell.

4. The method of claim 1, wherein the information about the plurality of non-anchor carriers comprises at least one of: a list of the plurality of non-anchor carriers, a respective frequency location of each of the plurality of non-anchor carriers, a respective closed subscriber group identifier associated with each of the plurality of second cells, a respective transmission power level of a narrowband reference signal associated with each of the plurality of second cells, and a respective threshold of a coverage enhancement level associated with each of the plurality of second cells.

5. The method of claim 4, further comprising:
   allocating respective physical random access channel resources to each of the plurality of second cells based on no consideration of the respective the coverage enhancement levels of the plurality of second cells, consideration of the respective coverage enhancement levels of the plurality of second cells, or consideration of the respective coverage enhancement levels of the plurality of second cells and a coverage enhancement level of the first cell.

6. The method of claim 1, wherein only the first cell is connected to a core network.

7. The method of claim 1, wherein the first cell and the plurality of second cells are each connected to a core network.

8. A method, comprising:
   receiving at least one signal broadcasted via a broadcast channel within a first cell, wherein the at least one signal is modulated using an anchor carrier and wherein the broadcast channel is associated with the anchor carrier;
   wherein the at least one signal indicates information about a plurality of non-anchor carriers that are respectively used in a plurality of second cells, wherein when one of the plurality of second cells is to connect to a core network, the method further comprises at least one of:
   receiving a first S1-interface message that includes a respective physical cell identifier associated with each of the plurality of second cells, a respective closed subscriber group identifier associated with each of the plurality of second cells, and a respective access mode associated with each of the plurality of second cells;
   receiving a second S1-interface message that includes a shared physical cell identifier associated with the first cell and the plurality of second cells, a shared closed subscriber group identifier associated with the first cell and the plurality of second cells, a shared access mode associated with the first cell and the plurality of second cells; and
   receiving a third S1-interface message that includes respective different physical cell identifiers associated with the first cell and the plurality of second cells, respective different closed subscriber group identifiers associated with the first cell and the plurality of second cells, respective different access modes associated with the first cell and the plurality of second cells.

9. The method of claim 8, wherein the first cell comprises a macro cell, and each of the plurality of second cells comprises a micro cell.

10. The method of claim 8, wherein the at least one signal further indicates a list of a plurality of neighboring cells that each has a similar radio coverage as the first cell.

11. The method of claim 8, wherein the information about the plurality of non-anchor carriers comprises at least one of: a list of the plurality of non-anchor carriers, a respective frequency location of each of the plurality of non-anchor carriers, a respective closed subscriber group identifier associated with each of the plurality of second cells, a respective transmission power level of a narrowband reference signal associated with each of the plurality of second cells, and a respective threshold of a coverage enhancement level associated with each of the plurality of second cells.

12. The method of claim 11, further comprising:
    selecting the first cell to camp on; and
    selecting one of the plurality of second cells to camp on based on the information about the non-anchor carriers.

13. The method of claim 11, further comprising:
    selecting either the first cell or one of the plurality of second cells to camp on based on the information about the non-anchor carriers.

14. The method of claim 8, wherein only the first cell is connected to a core network.

15. The method of claim 14, wherein when a serving cell is the first cell, the method further comprises:
   transmitting signals to the core network using the anchor carrier.

16. The method of claim 14, wherein when a serving cell is the second cell, the method further comprises:
   transmitting signals to the first cell using the non-anchor carrier; and
   transmitting the signal to the core network using the anchor carrier.

17. The method of claim 8, wherein the first cell and the plurality of second cells are each connected to a core network.

18. The method of claim 17, further comprising:
   transmitting signals to the core network using either the anchor carrier or the non-anchor carrier.

* * * * *